Oct. 30, 1951 — E. W. ALLARDT — 2,573,295
BEAD TRIMMER
Filed Feb. 15, 1946
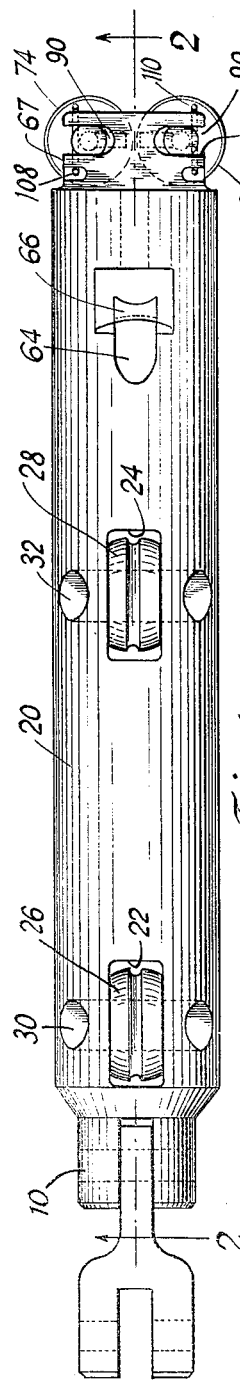
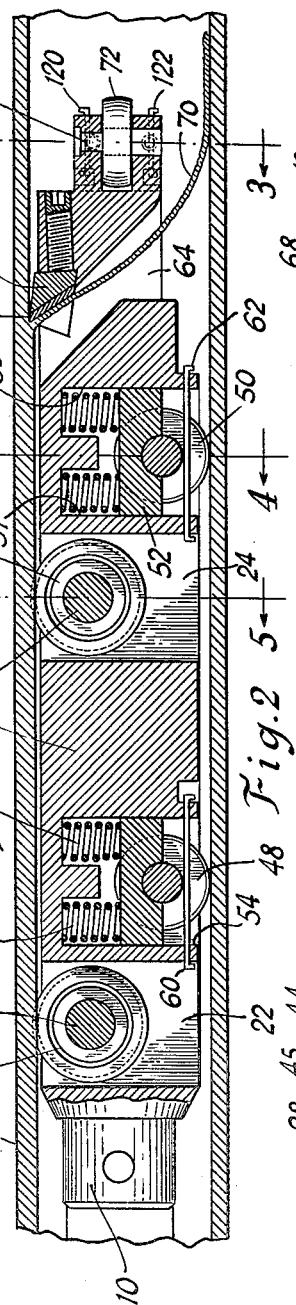
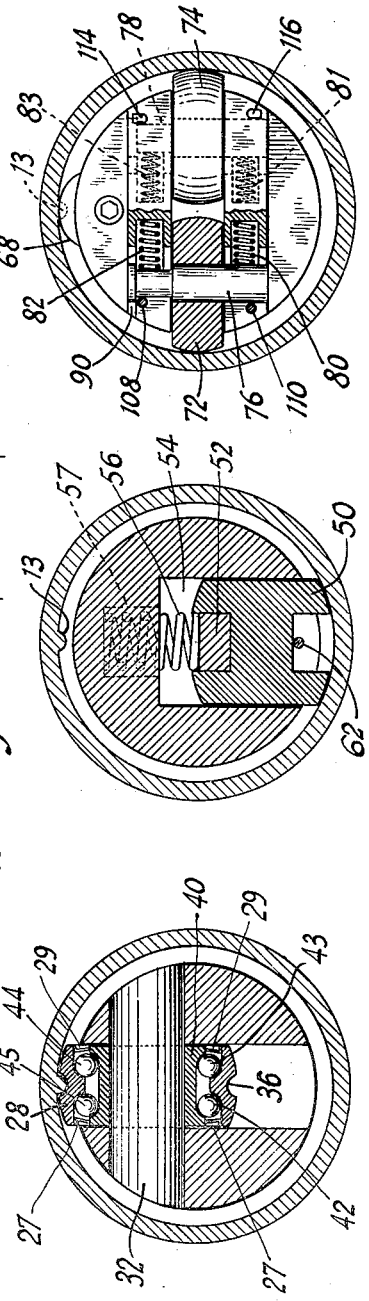
Fig.1  Fig.2  Fig.3  Fig.4  Fig.5
INVENTOR
Ernst W. Allardt
BY
R. W. Holbrook
ATTORNEY Patented Oct. 30, 1951

2,573,295

UNITED STATES PATENT OFFICE 2,573,295

BEAD TRIMMER

Ernst W. Allardt, Alliance, Ohio, assignor to The Babcock & Wilcox Tube Company, West Mayfield, Pa., a corporation of Pennsylvania Application February 15, 1946, Serial No. 647,851

7 Claims. (Cl. 90—24)

This invention relates to means for trimming the inside weld bead formed in the manufacture of resistance welded tubing. Such manufacture involves the bending of skelp to form open seam tubing, and a welding of that tubing along the seam.

In the manufacture of resistance welded tubing, the electrically heated skelp edges are forced together to form the seam weld, and in this process, there is extrusion of metal inwardly and outwardly of the tube. This extrusion forms ridges usually known as beads, and their thickness and conformation varies with the tube size, the wall thickness and welding conditions. To make an acceptable product, these beads must be removed, and it is, in many cases, particularly important that the inside bead be accurately and completely removed so that the tubing may have a smooth cylindrical bore.

This invention relates to the cutting of the inside bead by apparatus within the tube, the apparatus involving a cutter fixed within the tube and acting to remove the bead as the tubing is manufactured.

In the production of tubing having relatively thin walls, or having a relatively small bead extrusion, accurate control of the thickness of cut of the inner bead is particularly important, to the end that the finished interior tube surface will be smooth and uniform and conform to the inner diameter of the tube, and, in this type tubing, this is a problem of considerable difficulty.

It is, therefore, an object of the invention to accurately position the bead cutting tool with respect to the desired finished inside surface of the tube while holding the cutting tool in proper axial alignment in the direction of tube movement. In accomplishing this objective, the invention involves a bead trimmer having a novel type of upper spacing and guiding rolls, and a pair of spring loaded and laterally spaced tail rolls cooperating with the upper rolls.

The upper rolls have circumferential exterior grooves to receive the uncut bead at longitudinally spaced locations, and they function to align the cutter with the bead. However, as a bead varies in size or position, the cutter may still have slight angular movement, depending upon the clearance between the walls of the grooves and the bead section. To prevent, or minimize such angular movements, the invention involves a pair of spring loaded tail rolls which have a centering action on the trimmer body at a position adjacent the cutting element. With the circumferential position of the edge of the cutting element determined by the grooved upper rollers, and the axial alignment of the cutter determined by the tail rolls, it is possible to trim the bead down to the required tolerance from the circular inner tube wall contour.

The inside bead trimmer of this invention is, in normal operation, enclosed by welded tubing at a point rearwardly of the welding electrodes. This arrangement necessitates the connection of the body of the trimmer to one end of a rod or mandrel supported within the tube by a bracket which extends radially through the seam cleft in the open seam tubing.

The invention will be described with reference to the accompanying drawings, and other objects of the invention will appear as the description proceeds.

In the drawings:

Fig. 1 is a plan of the illustrative bead trimmer;

Fig. 2 is a sectional elevation of the Fig. 1 bead trimmer shown in its operative position within a welded tube;

Fig. 3 is a rear elevation showing one of the centering rollers in vertical section on the line 3—3 of Fig. 2;

Fig. 4 is a transverse vertical section on the line 4—4 of Fig. 2; and

Fig. 5 is a transverse section on the line 5—5 of Fig. 2.

The bead trimmer shown in Fig. 2 of the drawings is held stationary by means of a connection to the coupling 10, and the welded tube 12 moves to the right in the direction of the arrow 14.

As the tube is welded along the top longitudinal seam, there remains a small flash or bead 13 extending into the tube. The part of this bead which protrudes through the tube is cut off by the cutting element bead trimmer. The bead trimmer body 20 is preferably cylindrical and of a diameter somewhat smaller than the inside diameter of the tube 12.

Mounted within the upright openings 22 and 24 within the body 20 are rollers 26 and 28. They are mounted upon the fixed trunnions 30 and 32, each of these rollers having a bead groove such as that indicated at 36 in Fig. 5. As here shown, the roller 28 is similar in construction to a double row ball bearing with the inner race 40 directly and non-rotatably mounted on the trunnion 32 and the outer race 41 having the bead groove 36 formed therein. The balls 42—45 are confined between these two races.

Each of the rollers 26 and 28 is provided with dust shields such as those shown at 27 and 29 in Fig. 5. They are shown in the form of rings positioned between the inner and outer races 40 and 41. This dust shielded ball bearing type of roller, carried on a shaft fixed in the trimmer body, provides for more accurate positioning of the cutter edge inasmuch as it eliminates such a loose fit of the upper rollers as was previously regarded as necessary for preventing the rollers from binding.

In the operation of the illustrative bead trimmer, the rollers 26 and 28 are pressed upwardly so that the inside bead 13 may guide the trimmer by its disposition with the grooves such as 36. The means for pressing the bead trimmer body upwardly consists of two spring loaded rollers 48 and 50 shown in Figs. 2 and 4. In Fig. 4 the roller 50 is shown as having a central part of smaller diameter to receive the bearing follower 52. This element is confined within the upwardly extending socket 54 in the body 20, and the latter is spring urged upwardly by the expansion springs 56 and 58 which, as indicated in Figs. 2 and 4 are disposed within downward opening sub-sockets such as 57 and 59. To prevent the rollers 48 and 50 from dropping out of the body 20 while the trimmer is being moved to its operative position, or taken therefrom for maintenance purposes, retaining rods or wires such as 60 and 62 extend across the openings of the sockets in which the rollers are mounted. They are disposed in positions so that they are in the paths of movements of the trunnions of the rollers 48 and 50 and have downwardly bent ends to retain them in their operative positions.

Near the following end of the trimmer, there is a downwardly and rearwardly extending opening 64, and near the upward end of the opening is mounted the bead cutter 66. This is in the form of a tapered block which is transversely insertable through a correspondingly shaped tapered opening within the upper part of the body 20. Fixed to the mid-portion of the block 66 is the cutter element 68 (of a hard material such as carboloy) which is indicated in Fig. 2 as cutting the bead 13 from the tube in such a manner that the severed bead strip, as indicated in Fig. 2 at 70, passes through the opening 64 in the rear of the trimmer body.

Closely adjacent the bead cutter 66, and in a rearward extension 67 of the body 20 are a plurality of centering and guiding rollers as indicated at 72 and 74 in Fig. 3. They are mounted on vertical trunnions such as 76 and 78 and are spring pressed outwardly by the springs 80—83.

The upright trunnions 76 and 78 for the rollers 72 and 74 have heads which are guided in horizontal slots such as 90, these slots being formed in the upright sides of the vertical slots shown at 100 and 102 in Fig. 1.

The compression springs 82 and 83 are seated in opposed sockets in the body extension 67 in such a position that the left hand end of the spring 82 bears upon the trunnion 76 and the right hand end of the spring 83 bears upon the trunnion 78. Similarly, the springs 80 and 81 are seated within lower sockets in the body extension 67 so that they may bear, respectively, upon the lower ends of the trunnions 76 and 78.

The movement of the trunnion 76 to the left is limited by the normally fixed wires or rods 108 and 110, and the movement of the trunnion 78 to the right is similarly limited by the retaining wires 114 and 116. These wires are disposed within openings in the rear end of the trimmer body and their ends are transversely bent as indicated at 120 and 122 in Fig. 2. When it is desired to remove rollers 72 and 74 for the purposes of maintenance or repair, the wires 114 and 116 may be temporarily removed and replaced when the rollers are returned to their operative position, by manually straightening and subsequently rebending the ends such as 120 and 122.

What is claimed is:

1. An inside bead trimmer for severing a bead from a welded tube, said bead trimmer including an elongated body adapted to be disposed within the tube so as to permit relative longitudinal motion between the tube and the body, a bead cutter normally fixed to said body, and laterally spaced equally spring loaded rollers rotatably mounted on said body adjacent said cutter and laterally on either side thereof to engage opposite lateral portions of the inner surface of the tube to guide the cutter along the weld bead and stabilize its operation.

2. An inside bead trimmer for severing a bead from a welded tube, the bead trimmer including an elongated body construction adapted to be disposed within the welded tube to permit relative longitudinal movement between the body and the tube, a bead cutter having a cutting edge normally fixed relative to said body, and a pair of laterally spaced equally spring loaded rollers rotatably mounted on said body adjacent the cutter and laterally on either side thereof to stabilize its operation, said rollers projecting beyond the opposite sides of said body so as to contact opposite parts of the wall of the tube during the operation of the trimmer.

3. In an inside bead trimmer, an elongated body adapted to be disposed within a welded tube so as to permit relative longitudinal movement between the body and the tube, an upright bead cutter normally fixed to said body, a part of said body forming a severed bead passage adjacent the cutter, means for releasably locking the cutter in operative position, and a plurality of laterally spaced equally spring loaded rollers rotatably mounted in the body on upright axes laterally on either side of said cutter and with parts of different rollers projecting from opposite sides of the body to contact the tube walls and stabilize the action of the cutter along the weld bead.

4. An inside bead trimmer for severing a bead from a welded tube, said bead trimmer including an elongated body adapted to be disposed within the tube so as to permit relative longitudinal motion between the tube and the body, peripherally grooved rollers rotatably mounted on said body and adapted to receive the bead in their grooves, a bead cutter normally fixed to said body rearwardly of said rollers, and laterally spaced equally spring loaded rollers mounted in said body adjacent said cutter and laterally on either side thereof to guide the cutter along the weld bead and stabilize its operation, the latter rollers projecting from said body at opposite sides thereof normally contacting opposite interior tube surfaces.

5. An inside bead trimmer for severing a bead from a welded tube, the bead trimmer including an elongated cylindrical body adapted to be disposed within the welded tube to permit relative longitudinal movement between the body and the tube, a plurality of peripherally grooved bead guide rollers rotatably mounted on said body with the bead received within their grooves, a bead cutter having a cutting edge normally fixed relative to said body at a position beyond said rollers, and laterally spaced equally spring loaded rollers fixed to said body adjacent the cutter and laterally on either side thereof to stabilize its operation, said rollers projecting beyond the opposite sides of said body so as to contact the opposite parts of the wall of the tube during the operation of the trimmer, the spring loaded rollers being so mounted that they are rotatable upon axes at an angle of 90° or less to the axis of either one of the first mentioned rollers.

6. In an inside bead trimmer for severing beads from a resistance welded tube, an elongated trimmer body adapted to be disposed within the welded tube to permit relative longitudinal movement between the body and the tube, upper bead guided rollers rotatably mounted in the body and having peripheral grooves normally receiving the bead, said rollers projecting upwardly from the body, other rollers mounted in the body and projecting from the lower surface thereof to bear against the bottom of the tube, springs for biasing the body upwardly relative to the axes of the latter rollers, a bead cutting element having a cutting edge normally fixed relative to the body projecting transversely from its confines, and a plurality of opposed laterally spaced equally spring loaded side rollers projecting laterally of the body on either side of said cutter and disposed so that they contact opposite sides of the tube, said side rollers being rotatably mounted on the body at a position longitudinally adjacent the bead cutting element.

7. In an inside bead trimmer for severing a bead from the inner surface of a welded tube and including an elongated body adapted to be disposed within the tube for longitudinal motion relative thereto, a bead cutter normally fixed to the body, and peripherally grooved guide roller means on the body adapted to engage the bead to guide the bead cutter therealong, a pair of laterally spaced rollers mounted on the body adjacent the cutter and laterally on either side thereof, means equally biasing said rollers laterally to engage opposite portions of the inner surface of the tube to center the cutter on the bead, and removable means limiting outward movement of said rollers.

ERNST W. ALLARDT.

REFERENCES CITED

The following references are of record in the file of this patent:

UNITED STATES PATENTS

| Number | Name | Date |
|---|---|---|
| 1,212,503 | Klahn | Jan. 16, 1917 |
| 2,025,422 | Park | Dec. 24, 1935 |
| 2,053,831 | Jenkins | Sept. 8, 1936 |
| 2,202,914 | Jones | June 4, 1940 |
| 2,237,550 | Darner | Apr. 8, 1941 |
| 2,243,197 | De Fiore | May 27, 1941 |
| 2,286,513 | Sower | June 16, 1942 |